Oct. 23, 1951     E. F. JACKSON     2,572,808
DIELECTRIC WITH N,N'-1-3 DIMORPHOLINO ISOPROPANOL AS SCAVENGER
Filed Sept. 18, 1948
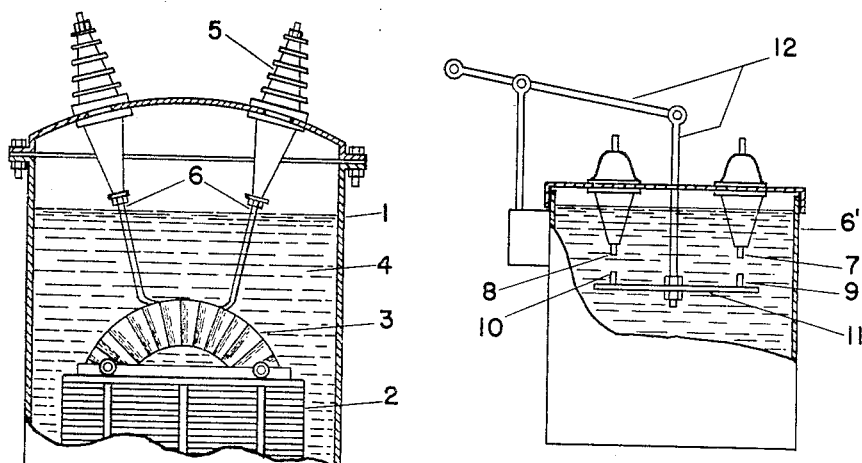
FIG. 2
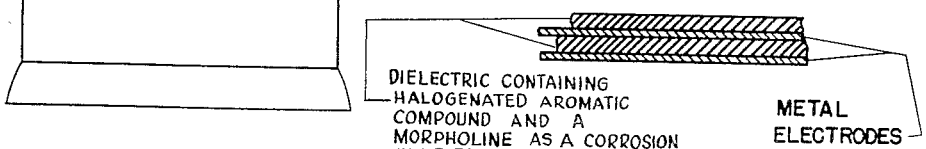
FIG. 1
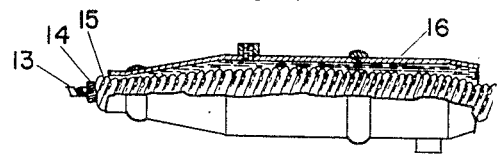
FIG. 4
FIG. 5
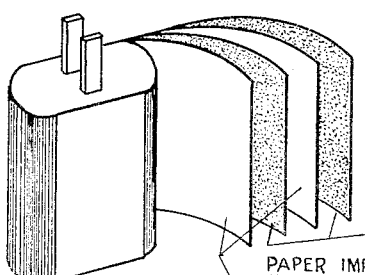
FIG. 3
*INVENTOR.*
ELWOOD F. JACKSON
BY Elmer P. Rucker
ATTORNEY

UNITED STATES PATENT OFFICE 2,572,808

DIELECTRIC WITH N,N'-1-3 DIMORPHOLINO ISOPROPANOL AS SCAVENGER

Elwood F. Jackson, Ludlow, Mass., assignor to Monsanto Chemical Company, St. Louis, Mo., a corporation of Delaware Application September 18, 1948, Serial No. 49,986

4 Claims. (Cl. 252—63.7)

The present invention relates to novel compositions of matter comprising halogenated organic compounds and a scavenging or corrosion-inhibiting material selected from the group consisting of morpholine and its substituted derivatives. More specifically the invention relates to apparatus, particularly electrical apparatus such as capacitors, transformers, circuit breakers, cables and the like containing the above compositions.

Halogenated organic compounds, more particularly halogenated aromatic compounds such as chlorinated biphenyl and chlorinated naphthalene are highly useful electrical insulating and heat exchanging materials because of their high dielectric constants, thermal stability, resistance to oxidation, non-flammability and other valuable properties. However, it has been found that when exposed to elevated temperatures and/or high voltages, they partially decompose liberating hydrogen halides which are exceedingly corrosive to heat exchanging equipment and electrical apparatus.

For example, in transformers, circuit breakers and other electrical devices in which arcing occurs, the development of hydrogen halides as a result of the above decomposition presents a serious problem as they decrease the dielectric strength of the composition containing same and cause considerable damage by attacking paper insulation and corroding metal parts of the apparatus in which the composition is used. The undesirable effect of the above decomposition is further manifested when the above halogenated organic compounds are used as capacitor impregnants. Thus, under high operating temperatures and direct current voltages, capacitors impregnated therewith undergo a characteristic type of deterioration which results in an ever increasing leakage current, a short capacitor life, visible localized decomposition of the dielectric and corrosion of the electrodes. Moreover, in the case of capacitors operating on alternating current, the decomposition sometimes results in an excessive increase in power factor of the dielectric material.

It is, therefore, the object of the present invention to provide new compositions of matter containing halogenated organic compounds wherein the above objectionable properties are either completely eliminated or substantially reduced.

An additional object is to provide transformers, capacitors, circuit breakers, cables and the like containing halogenated organic compounds in combination with a corrosion inhibitor or scavenger whereby the deleterious action of hydrogen halides on the paper insulation and metal parts thereof is eliminated or materially reduced.

Another object is to provide a capacitor impregnant containing halogenated organic compounds and a corrosion inhibitor or scavenger, whereby the deleterious effect of hydrogen halides on the electrodes and paper insulation of capacitors is substantially reduced or completely eliminated with the result that the capacitor has a longer useful life and greater dielectric stability than similar capacitors not containing the corrosion inhibitor.

A further object is to provide the cellulosic insulation in transformers containing liquid halogenated organic compounds with protection against rapid destruction by hydrogen halides evolved as the result of a minor arc within the transformer, thus permitting complete repair of the assembly by rapid replacement or removal of the particular part that gave rise to the arc and thereby avoiding destruction of the entire paper insulation of the transformer with a consequent high cost of repair.

A still further object is to provide switches, cables and the like containing halogenated organic compounds and a corrosion inhibitor or scavenger which practically eliminates the rusting and corrosion normally accompanying the use of such devices filled with halogenated organic compounds per se.

Other objects and advantages of the present invention will become apparent to those skilled in the art as the description proceeds.

I have discovered that halogen decomposition products can be rendered substantially innocuous and the above objectives accomplished if, in accordance with the present invention, the halogenated organic compound to be protected is associated with at least one compound selected from the group consisting of morpholine and its substituted derivatives. Such compounds may be represented generically by the following structural formula:

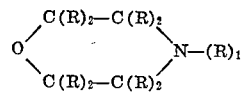

wherein R represents hydrogen or a monovalent hydrocarbon radical and R₁ represents hydrogen or an organic radical. Illustrative examples of monovalent hydrocarbon radicals which R may represent are aliphatic (e. g. methyl, ethyl, propyl, isopropyl, butyl, secondary butyl, isobutyl, amyl, isoamyl, hexyl, heptyl, octyl, etc.); cycloaliphatic (e. g. cyclopentyl, cyclohexyl, cycloheptyl, etc.); aryl (e. g. phenyl, diphenyl, naphthyl, etc.); aliphatic-substituted aryl (e. g. tolyl, xylyl, ethyl phenyl, propyl phenyl, isopropyl phenyl; and aryl-substituted aliphatic (e. g. benzyl, phenyl ethyl, phenyl propyl, etc.). R₁ represents similar organic radicals which may also serve as a connecting link with another morpholine group, and may include various substituents such as hydroxy, ether, keto and halogen groups.

As specific examples of compounds of the type covered by the general formula, there may be mentioned morpholine, methyl morpholine, dimethyl morpholine, ethyl morpholine, N-phenyl morpholine, N-biphenyl morpholine, N-naphthyl morpholine, N-($\alpha$)-naphthyl methyl morpholine, N-phenylethyl morpholine, N-($\alpha$)-phenylethyl morpholine, N-($\gamma$) phenyl morpholine, N-benzyl-2, 6-dimethyl morpholine, N-o-(n) butoxy benzyl morpholine, N-cyclohexyl morpholine, N-hydroxy phenyl, dimethyl morpholino isopropanol, ethyl morpholino ethyl ether, dimorpholino diethyl ether and N,N'1-3, dimorpholino isopropanol. Of these compounds, morpholino is preferred as it exhibits outstanding properties from the standpoint of inhibiting the deleterious action of halogen decomposition products on metal and organic insulation materials.

For a more complete understanding of the present invention, reference is made to the accompanying drawings and the experimental data hereinafter presented in the specific examples.

Figure 1 is a front elevation partly in section of a transformer; Figure 2 illustrates a switch in a similar manner; Figure 3 represents a rolled capacitor; Figure 4 shows a sectional view of a portion of the electrodes and dielectric sheets of Figure 3; and Figure 5 is a side view of a cable, the casing being partly removed to permit the interior of the parts to be seen.

The transformer illustrated in Figure 1 comprises a casing 1, core 2, coils 3 insulated with manila paper, kraft paper, cotton or other fibrous insulation, insulating and cooling medium 4, lead-in bushings 5, and suitable leads 6 connected to the coil assembly. The insulating and cooling medium may consist of chlorinated biphenyl, trichlorbenzene and morpholine in the following proportions.

| | Parts by weight |
|---|---|
| Chlorinated biphenyl (60% Cl) | 60 |
| Trichlorbenzene | 40 |
| Morpholine | 0.1 |

Other well known liquid halogenated hydrocarbons or mixtures thereof may be used as the insulating and cooling liquid and various other halogenated organic compounds may constitute a part of such compositions, such as for example, halogenated compounds of naphthalene, toluene, benzene, nitro-diphenyl, diphenyl oxide, diphenyl ketone, diphenyl methane, diphenyl ethane, terphenyls, quaterphenyls, etc.

The presence of 0.05 to 0.1 part by weight of morpholine and the other inhibitors of the present invention in the cooling and insulating liquid will not only substantially reduce the deleterious effect of such liquid on organic insulation but will also greatly reduce the corrosion of the metal parts of the transformer which come in contact therewith in the presence or absence of air.

The switch shown in Figure 2 comprises a casing 6', fixed contacts 7 and 8, and movable contacts 9 and 10 which cooperate therewith. The movable contacts are mounted upon a support 11 which in turn is operatively connected to actuating levers 12. The following is illustrative of a suitable arc quenching liquid which may be used in this device, it being understood that the invention is not limited thereto.

| | Parts by weight |
|---|---|
| Chlorinated biphenyl (55% Cl) | 80 |
| Trichlorbenzene | 20 |
| N-ethyl morpholine | 0.05 |

In the operation of electric switches, the unavoidable arcing which accompanies make-and-break of the switch contacts results in partial decomposition of the chlorinated biphenyl or other halogenated organic compounds. The presence of the morpholines of the present invention in the above liquid renders the halogen decomposition products innocuous with the result that switches provided therewith are substantially free from the corrosion normally accompanying the use of such devices filled with halogenated organic compounds per se.

The capacitor shown in Figure 3 is made up of alternate layers of metal foil such as aluminum or tin foil separated by sheets of dielectric material. It is produced by interleaving two dielectric sheets, such as linen or kraft paper, with the metal foil, and rolling the interleaved sheets in the conventional manner. The rolled capacitor is then impregnated with the dielectric composition by any suitable process, such as vacuum impregnation, with chlorinated biphenyl having dissolved therein a small proportion of a morpholine such as N-ethyl morpholine. The capacitor is then placed in a protective case or otherwise used as desired.

The following range of compositions is illustrative of suitable capacitor impregnants:

COMPOSITION I

| | |
|---|---|
| Liquid chlorinated biphenyl, particularly chlorinated biphenyl containing from 42% to 60% by weight of chlorine | 0%–100% by wt. |
| Conventional chlorinated organic dielectric materials | About 100%–0% by wt. |
| Morpholine or substituted derivatives thereof | 0.01%–1% by wt. |

COMPOSITION II

| | Parts by weight |
|---|---|
| Chlorinated biphenyl (42%–60% Cl) | 60 |
| Trichlorbenzene | 40 |
| N-ethyl morpholine | 0.1 |

Of the above range of compositions, the preferred capacitor impregnant is one having the following composition:

| | Parts by weight |
|---|---|
| Chlorinated biphenyl (60% Cl) | 60 |
| Trichlorbenzene | 40 |
| N-ethyl morpholine | 0.1 |

The presence of morpholines in chlorinated biphenyl or other halogenated organic compounds provides excellent protection against the deleterious action of halogen decomposition products on metal, paper and other organic insulation material and consequently capacitors provided therewith will have a longer useful life and greater dielectric stability than similar capacitors containing halogenated organic compounds per se. Moreover, capacitors containing morpholines will not exhibit an ever increasing power factor with time when operated at high temperatures and voltages as is typical of capacitors impregnated with halogenated organic materials which are not associated with one of the above corrosion inhibitors.

Figure 4 shows a section of one turn of the finished rolled capacitor illustrating the alternate electrodes and dielectric layers. In accordance with the present invention, the finished capacitor contains a halogenated organic compound, preferably chlorinated biphenyl, and a minor portion of morpholine or its substituted derivatives.

The cable of Figure 5 comprises a core 13, cable conductors 14, insulation consisting of paper or other suitable material 15 and a casing 16. The space between the insulated conductors and the casing is filled with a mixture of any of the liquid chlorinated organic compounds and morpholines mentioned above. Such a composition may consist of a mixture of the following ingredients, but it is to be clearly understood that the invention is not restricted thereto.

| | Parts by weight |
|---|---|
| Chlorinated biphenyl (60% Cl) | 50 |
| Trichlorobenzene | 50 |
| N,N'-1-3 dimorpholino isopropanol | 0.1 |

In addition to the applications mentioned above, the compositions of the present invention are useful as heat exchange media for controlling the temperature of catalytic and other chemical reactors, for cooling gases and liquids and for use in numerous other heat exchanging operations.

The experimental data hereinafter presented illustrate in a striking manner the scavenging or corrosion inhibiting action of morpholines on dielectric compositions containing halogenated organic compounds. In accordance therewith, the effect of the corrosion inhibitor is brought out by showing and comparing the action of an HCl-saturated halogenated dielectric composition, with and without the inhibitor, on organic dielectric materials such as paper. The effectiveness of the inhibitor is manifested by the protection it affords paper against attack by hydrogen chloride and the degree of attack is indicated by the extent to which the tensile strength of the paper is decreased. This will be rendered more apparent by reference to the following examples.

Example I

Six strips of manila wrapping paper (6" x 1") were humidified at 65% R. H. at 70° F. for a period of 48 hours and subjected to tensile strength tests. These tests were run on a Scott IP-2 serigraph with a jaw separation of 3 inches and a rate of travel of 34.5 seconds for a load of 40 lbs. The result of these tests, being the average of 6 breaks, was as follows: Tensile strength of paper samples, 46.2 lbs./in.

Example II

Six strips of the same piece of manila wrapping paper (7" x 1") were allowed to soak at a temperature of 75° C. for 1½ hours in an HCl saturated solution consisting of 60 parts by weight of chlorinated biphenyl (60% Cl) and 40 parts by weight of trichlorbenzene and at the end of this operation, the papers were soaked for 15 minutes in benzene, another 15 minutes in methanol and dried. After cutting one half inch from each end of the dried paper strips, they were subjected to the above tensile strength tests with the following result: Tensile strength of impregnated paper samples, 11.5 lbs./in.

These examples demonstrate that HCl had a highly deleterious action on the samples since the tensile strength of the paper changed from 46.2 lbs./in. to 11.5 lbs./in., a decrease in tensile strength of approximately 75%.

Example III

The foregoing example was repeated using samples of the same paper and the same impregnant except that 0.1 part by weight of morpholine was added. The tensile strength of the impregnated paper was found to be 49.2 lbs./in., thus demonstrating that the above compound is a highly effective material for rendering halogen decomposition products such as HCl innocuous to paper or other fibrous organic dielectrics.

Example IV

The procedure described in Example III was followed except that N-ethyl morpholine in an amount corresponding to 0.1 part by weight was substituted for morpholine. The paper samples had an average tensile strength of 48.1 lbs./in. as compared with 11.5 lbs./in. for the samples treated with impregnant not containing a scavenger, and 46.2 lbs./in. for the unimpregnated samples.

Example V

The procedure described in Example III was repeated using 0.1 part by weight of N-hydroxy ethyl morpholine and N,N'-1-3 dimorpholino isopropanol respectively and the following results were obtained:

| | Lbs./in. |
|---|---|
| Tensile strength of untreated paper | 46.2 |
| Tensile strength of paper treated as in Example II | 11.5 |
| Tensile strength of paper treated with composition consisting of 60 parts by weight of chlorinated biphenyl (60% Cl), 40 parts by weight of trichlorbenzene and 0.1 part by weight of N-hydroxyethyl morpholine | 47.1 |
| Tensile strength of paper treated with composition consisting of 60 parts by weight of chlorinated biphenyl (60% Cl), 40 parts by weight of trichlorbenzene and 0.1 part by weight of N,N'-1-3 dimorpholino isopropanol | 44.9 |

The above examples clearly demonstrate the effectiveness of morpholines as scavengers or corrosion inhibitors as the papers treated therewith actually gained in tensile strength in all cases except where N,N' 1-3 dimorpholino isopropanol was used and in that case the tensile strength was decreased only slightly.

The following table illustrates the electric properties of the dielectric composition consisting of 60 parts by weight of chlorinated biphenyl (60% Cl) and 40 parts by weight of trichlorbenzene and also shows the effect thereon of adding 0.1 part by weight of morpholine, N-ethyl morpholine, N-hydroxyethyl morpholine and N,N'-1-3 dimorpholino isopropanol.

| | Parts by weight | Dielectric Strength at 30° C. | Dielectric Constant at 1000 cycles at 100° C. |
|---|---|---|---|
| Chlorinated diphenyl (60% Cl) | 60 | 43 | 3.8 |
| Trichlorbenzene | 40 | | |
| Chlorinated diphenyl | 60 | | |
| Trichlorbenzene | 40 | 43.2 | 3.8 |
| Morpholine | 0.1 | | |
| Chlorinated diphenyl | 60 | | |
| Trichlorbenzene | 40 | 43 | 3.8 |
| N-ethyl morpholine | 0.1 | | |
| Chlorinated diphenyl | 60 | | |
| Trichlorbenzene | 40 | 42 | 3.9 |
| N-hydroxyethyl morpholine | 0.1 | | |
| Chlorinated diphenyl | 60 | | |
| Trichlorbenzene | 40 | 40 | 3.9 |
| N,N'-1-3 dimorpholino isopropanol | 0.1 | | |

The above experimental data indicate that the above morpholines do not seriously affect the electrical properties of the halogenated organic compounds associated therewith and that, therefore, such compositions are suitable for use in transformers, capacitors, switches, cables and other electrical devices.

The description of the present invention has been directed primarily to compositions containing chlorinated biphenyl, trichlorbenzene and morpholine or its substituted derivatives, but it is to be understood that the invention is not restricted thereto but embraces halogenated organic compounds generally. Thus, the above morpholines may be used as scavengers or corrosion inhibitors for chlorinated naphthalene, chlorinated diphenyl ketone, chlorinated diphenyl oxide, chlorinated diphenyl methane, chlorinated diphenyl ethane, chlorinated benzene, chlorinated toluene, chlorinated nitro diphenyl, chlorinated alkylated benzenes, chlorinated alkylated biphenyls, ethyl trichlorbenzene, ethyl tetrachlorbenzene, ethyl pentachlorbenzene, chlorinated terphenyls, chlorinated quaterphenyls, chlorinated paraffinic hydrocarbons, chlorinated alicyclic hydrocarbons, chlorinated oxygen-containing organic compounds, chlorinated rubber, chlorobutadiene polymers, polyvinyl chloride, polymeric vinyl chloroacetate, chlorinated fats, chlorinated vegetable oils, chlorinated animal oils, chlorinated mineral oils or mixtures of two or more of these. In place of the chlorinated compounds, the corresponding fluorine, bromine and iodine derivatives may be used. In fact, any halogenated organic compound or composition which tends by reason of its halogen content to cause corrosion of metals or dehydration of paper or organic fibrous insulation, may be rendered substantially innocuous by means of the morpholines defined by the general formula set out above.

The method of incorporating the morpholines varies with the halogenated organic compound or composition. If the compound or composition is liquid at room temperature, the above compounds are merely dissolved therein in suitable concentrations; if it is a solid, the morpholines are blended therewith by the use of solvents or swelling agents or by means of mixing rolls, etc. In the case of halogenated polymers, the morpholines may be incorporated before, during or after polymerization of the corresponding monomers.

The quantity of morpholines used varies with the halogenated organic compound or composition. In general, satisfactory results are obtained by employing these compounds in an amount varying from 0.05% to 1% and preferably from 0.05% to 0.1% by weight of the halogenated organic compound or composition, but it is to be understood that the invention is not limited thereto as slightly lower and somewhat higher concentrations may be employed. Stated broadly, the morpholines may be used in amounts varying from 0.01% by weight up to and above the limit of their solubility in the halogenated organic compound or composition. In most instances, it is desirable not to exceed the solubility limits of the morpholines, but there are some applications such as heat exchanging operations in which this may be done without harmful effects.

The 1-3 dimorpholino isopropanol mentioned earlier herein is a colorless (water white) oily liquid boiling at about 130° C. at 0.5 mm. of mercury. It is a new compound and may be prepared by reacting about two moles of morpholine about one mole of epichlorohydrin at a temperature of about 90° C.–110° C.

As widely different embodiments of this invention may be made without departing from the spirit thereof, it is to be understood that the invention is not limited to the specific embodiments except as defined in the appended claims.

What I claim is:

1. As a new compound, N,N'-1-3 dimorpholino isopropanol.

2. A heat transfer and dielectric composition consisting essentially of a halogenated aryl hydrocarbon and as a scavenger therefor about 0.05% to about 1% by weight of N,N'-1-3 dimorpholino isopropanol.

3. A heat transfer and dielectric composition consisting essentially of chlorinated biphenyl and as a scavenger therefor about 0.05% to about 1% by weight of N,N'-1-3 dimorpholino isopropanol.

4. A dielectric composition consisting of about 50% by weight of chlorinated biphenyl, about 50% by weight of trichlorbenzene and as a scavenger therefor about 0.1% by weight of N,N'-1-3 dimorpholino isopropanol.

ELWOOD F. JACKSON.

REFERENCES CITED

The following references are of record in the file of this patent:

UNITED STATES PATENTS

| Number | Name | Date |
|---|---|---|
| 2,041,594 | Clark | May 19, 1936 |
| 2,453,493 | Clark et al. | Nov. 9, 1948 |